United States Patent [19]
Oloman et al.

[11] Patent Number: 5,968,325
[45] Date of Patent: Oct. 19, 1999

[54] AUTO-ELECTROLYTIC HYDROGEN GENERATOR

[75] Inventors: Colin William Oloman, Vancouver; Jonathan Wing-Fai Ho, Richmond; Jielin Song, Vancouver, all of Canada

[73] Assignee: A.T.S. Electro-Lube Holdings Ltd., Canada

[21] Appl. No.: 08/779,626

[22] Filed: Jan. 7, 1997

[51] Int. Cl.[6] .................................................. C25C 7/00
[52] U.S. Cl. .................... 204/230.5; 204/256; 204/270; 204/292; 204/293; 204/294; 204/284; 204/290 R
[58] Field of Search .................................. 204/256, 268, 204/258, 270, 292, 294, 284, 290 R, 228, 229, 230, 293

[56] References Cited

U.S. PATENT DOCUMENTS

| | | | |
|---|---|---|---|
| 3,256,504 | 6/1966 | Fidelman | 204/248 |
| 3,374,158 | 3/1968 | Lord et al. | 204/129 |
| 3,739,573 | 6/1973 | Giner | 60/37 |
| 3,840,454 | 10/1974 | Jansta et al. | 204/230 |
| 3,870,616 | 3/1975 | Dempsey et al. | 204/230 |
| 4,023,648 | 5/1977 | Orlitzky et al. | 184/39 |
| 4,057,479 | 11/1977 | Campbell | 204/258 |
| 4,146,446 | 3/1979 | von Sturm | 204/129 |
| 4,288,913 | 9/1981 | Parsen et al. | 29/623.5 |
| 4,337,140 | 6/1982 | Solomon | 204/292 |
| 4,414,071 | 11/1983 | Cameron et al. | 204/242 |
| 4,424,105 | 1/1984 | Hanson | 204/228 |
| 4,455,358 | 6/1984 | Graham et al. | 429/190 |
| 4,534,837 | 8/1985 | Nicolas et al. | 204/129 |
| 4,671,386 | 6/1987 | Orlitzky | 184/39 |
| 4,737,257 | 4/1988 | Boulton | 204/291 |
| 4,784,730 | 11/1988 | Willis et al. | 1204/40 |
| 5,089,107 | 2/1992 | Pacheco | 204/228 |
| 5,242,565 | 9/1993 | Winsel | 204/265 |
| 5,395,709 | 3/1995 | Bowker et al. | 429/152 |
| 5,401,371 | 3/1995 | Oshima et al. | 204/258 |
| 5,404,966 | 4/1995 | Yang | 184/39 |
| 5,527,642 | 6/1996 | Meadows et al. | 429/210 |
| 5,547,043 | 8/1996 | Graf et al. | 184/39 |
| 5,567,284 | 10/1996 | Bauer et al. | 204/256 |
| 5,585,208 | 12/1996 | Lian et al. | 429/190 |

FOREIGN PATENT DOCUMENTS

1333579  12/1994  Canada.

*Primary Examiner*—Donald R. Valentine
*Attorney, Agent, or Firm*—Townsend and Townsend and Crew

[57] ABSTRACT

An auto-electrolyte hydrogen generating reactor having a plurality of cells. The cells are stacked in series in an electronically non-conductive housing. Each cell is separate from its neighbour by electronically conductive bipolar walls. Each cell comprises an anode with a metal whose standard oxidation potential is above that of hydrogen in the same electrolyte. There is a solid electrolyte and a cathode. The cathode is an inert electronic conductor with a surface in contact with a solid electrolyte. The surface is electrochemically catalytic for the formation of hydrogen.

20 Claims, 7 Drawing Sheets

AUTO-ELECTROLYTIC HYDROGEN GENERATOR

FIELD OF THE INVENTION

This invention relates to a reactor comprising a plurality of cells having a sandwich structure. The reactor is particularly appropriate as a hydrogen generator, that is a reactor in which hydrogen is produced, and finds particular application in automatic fluid dispensers, for example lubricant dispensers.

BACKGROUND OF THE INVENTION

The desirable characteristics of an electrochemical gas generator for a fluid dispenser are:

I. The generator should be compact, eg. with a volume less than about 10% of the fluid to be dispensed, and be capable of delivering a total volume of gas (at STP) several times (eg. 4 times) the total volume of the dispensed fluid.

II. The gas production should be switchable (on/off).

III. The rate of gas generation should be controllable over a wide (eg. tenfold) range.

IV. The rate of gas generation should be relatively unaffected by changes in temperature. For this purpose the electronic circuit connecting the poles of the reactor may beneficially include a high resistance with a positive coefficient of resistivity, so that as temperature is increased the drop in electrolytic resistance is compensated by a corresponding increase in electronic resistance.

V. Once switched on the gas generation should be spontaneous, without requiring an external source of power.

VI. The unit should have a long "shelf life" (eg. one year) and should not generate gas when not switched on (ie. no self discharge).

Prior work in this field can be divided into five areas:

(a) Fluid dispensers as described and claimed by Graf in U.S. Pat. No. 5,547,043 and Satzinger and others. These dispensers are driven by gas, usually hydrogen, which is produced by the spontaneous reaction of a short circuited bimetal galvanic couple, for example zinc/molybdenum, with an aqueous electrolyte, for example aqueous potassium hydroxide.

(b) Fluid dispensers as described and claimed by Orlitzky et al in U.S. Pat. No. 4,023,648 and Winsel in Canadian Patent 1,333,579. These dispensers are driven by a gas, usually hydrogen, produced by spontaneous reaction of metal electrodes, for example zinc/hydrogen on nickel, in a monopolar electrochemical cell with the electrodes connected and controlled through an external electronic resistance.

(c) Fluid dispensers, as described by Orlitzky et al in the above U.S. Pat. No. 4,023,648 and Yang in U.S. Pat. No. 5,404,966. These dispensers are driven by gas, for example nitrogen, produced by a monopolar electrochemical cell driven by a separate battery, connected and controlled through an external electronic resistance.

(d) Bipolar electrochemical hydrogen generators, such as described and claimed by Fidelman in U.S. Pat. No. 3,256,504 and Pacheco in U.S. Pat. No. 5,089,107. These generators have metal anodes, for example magnesium or aluminium, with inert cathodes connected in series with an external resistance and activated to spontaneously produce hydrogen when immersed in salt water.

(e) Bipolar batteries, such as described and claimed by Bowker in U.S. Pat. No. 5,395,709 and Meadows in U.S. Pat. No. 5,527,642. In this equipment a plurality of spontaneous electrochemical cells contained in a housing is connected through bipolar walls to form a battery stack for energy generation.

(f) Bipolar electrochemical reactors for hydrogen generation, for example as described by Oshima et al in U.S. Pat. No. 5,401,371. These reactors are used for the electrolysis of water to generate both hydrogen and oxygen and are driven by an external source of energy.

The above prior art fails to satisfy the desirable criteria set out above. For example (a) gives a compact spontaneous unit but it is not switchable. Also as it operates through an electronic short circuit it is relatively sensitive to change in temperature. The gas generators of (b) are switchable, spontaneous and controllable through an external electronic resistance. However the magnitude of the external resistance is limited by the relatively low voltage available from a monopolar electrochemical cell, for example about 0.4 volts from zinc/hydrogen. The systems of (c) are switchable and controllable through a large external resistance and so relatively insensitive to temperature. But they are not spontaneous and require external batteries for operation. For example two, 1.5 volt batteries in series may be required.

The bipolar electrochemical gas generators of (d) are spontaneous and it is claimed that they are controllable through an external resistance. However as shown in U.S. Pat. Nos. 3,256,504 and 5,089,107 these bipolar units are not switchable or controllable but will generate hydrogen spontaneously when in contact with an electrolyte, for example salt water. This is due to electronic short circuits between anodes and cathodes in a common electrolyte. The bipolar batteries described under (e) are spontaneous and may be assembled to deliver multiples of the unit cell voltage but batteries are not required to produce gas, in fact batteries are designed to avoid gas generation. Finally hydrogen generators such as described in (f) require an external power source and produce oxygen and hydrogen at the same time.

SUMMARY OF THE INVENTION

The present invention seeks to provide an improved monopolar, spontaneous electrochemical gas generating cell. The cell of the invention is particularly appropriate for a bipolar electrochemical gas generator which is compact, inexpensive and suitable for use in automatic fluid dispensing devices.

Accordingly in a first aspect, the present invention is a hydrogen generating reactor comprising a plurality of cells stacked in series in an electronically non-conductive housing, each cell separated from its neighbour by electronically conductive bipolar walls each cell comprising;

an anode of a metal whose standard oxidation potential is above that of hydrogen in the same electrolyte;

a solid electrolyte;

a cathode comprising an inert electronic conductor with a surface in contact with said solid electrolyte, said surface being electrochemically catalytic for the formation of hydrogen.

The anode metal is of a high hydrogen over potential to suppress self discharge of hydrogen when the circuit is open. Preferred metals are zinc and aluminium. The anode may be a solid plate, a porous matrix or a gelled powder. An example of a gelled powder is zinc powder dispersed in a water base gel.

The electrolyte has a high electrolytic conductivity, high stoichiometric capacity for hydrogen production by the decomposition of water and the ability to complex the anode metals to prevent de-activation of the anode by solid reaction products, for example metal oxides/hydroxides. The electrolyte is fixed in a solid form, for example in a paste, a sponge or a gel. A preferred electrolyte for a zinc anode is a gelled aqueous solution of potassium hydroxide.

The cathode is a stable electronic conductor whose surface has a low hydrogen overvoltage to promote hydrogen generation when the electronic circuit from anode to cathode is closed. Examples of appropriate cathodes materials are platinum, palladium and a nickel. Useful cathodes also include platinised carbon/polytetrafluoroethylene (PTFE) gas diffusion electrodes which are relatively expensive, and nickel mesh having a platinum surface, which is relatively inexpensive.

The cell is normally housed within a solid, non-conductive container, for example, polypropylene.

In a preferred embodiment the reactor comprises a plurality of cells defined above, stacked in series, each separated from its neighbour by electronically conductive bipolar walls all in a non-conductive housing.

Such a reactor has external positive and negative poles and a circuit comprising a switch and an adjustable resistance with a positive temperature coefficient of resistivity.

There are electronically conductive, but electrochemically inert, bipolar walls between the anodes and cathodes of individual cells in a bipolar reactor. These bipolar walls must be electrochemically inert so as not to promote the self discharge of the anodes. With a zinc anode and a gelled potassium hydroxide electrolyte preferred bipolar walls are made of brass. An electronically conductive porous layer, for example of graphite felt, may be compressed between the bipolar wall and the cathode to allow disengagement of the hydrogen.

Electrolyte leakage between cells must be prevented. The preferred method of eliminating leakage comprises fixing the electrolyte in a solid gel which is further held in an open-ended, non-conductive thin walled container.

DESCRIPTION OF THE PREFERRED EMBODIMENTS

Figure 1:
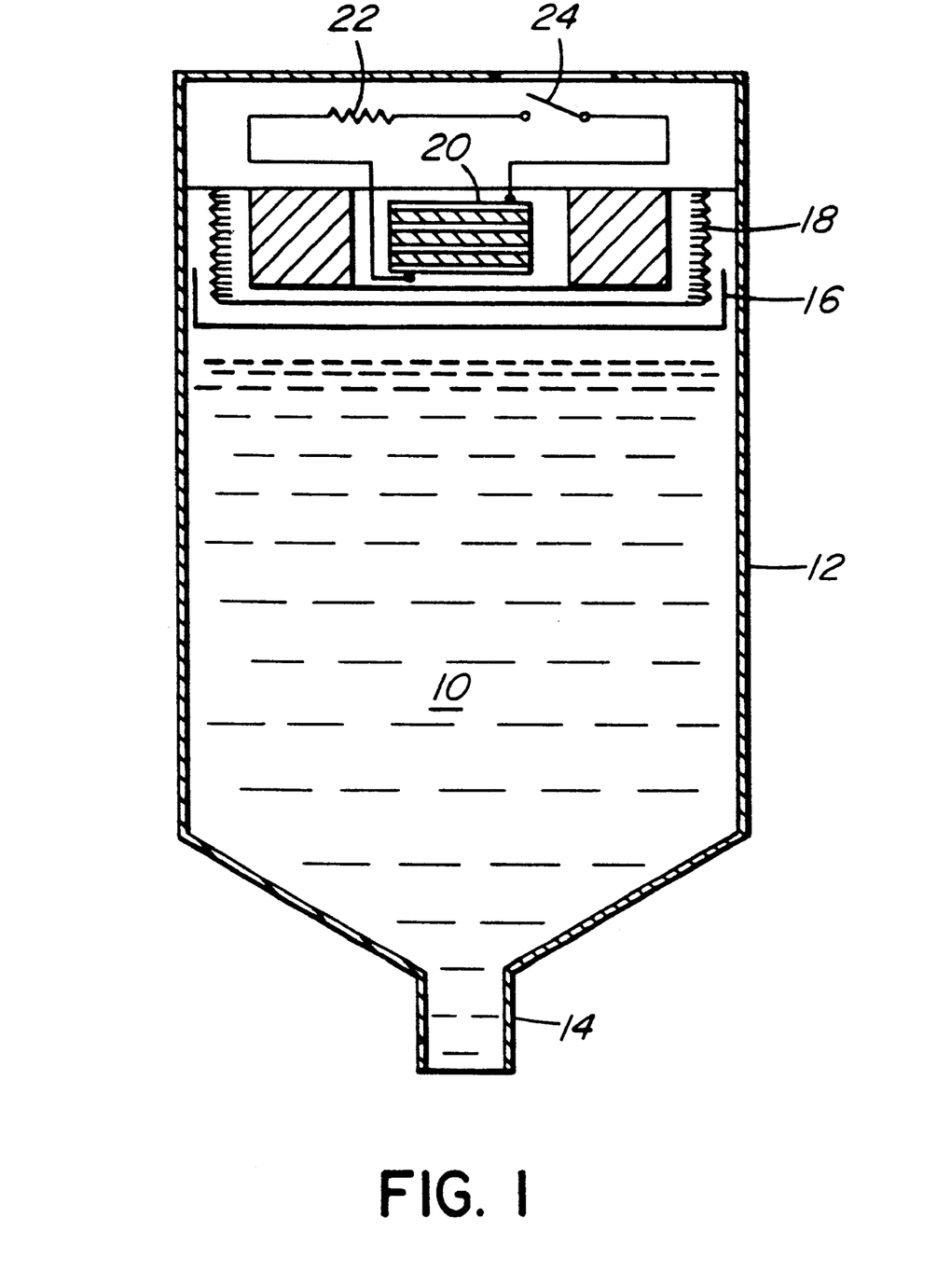
FIG. 1 is a section through a fluid dispenser driven by a reactor according to the present invention.

FIG. 1 illustrates a dispenser for a fluid 10. The dispenser has a body 12 and an outlet nozzle 14. There is a piston 16 and a bellows 18 to force the fluid 10 from the nozzle 14. The necessary force is generated by a bipolar hydrogen generator 20 having an external circuit that includes a resistor 22 and a switch 24.

Other than the hydrogen generator the substance of FIG. 1 forms part of the prior art, for example as disclosed in U.S. Pat. No. 4,671,386 issued to Orlitzky, the disclosure of which is hereby specifically incorporated by reference.

Figure 2:
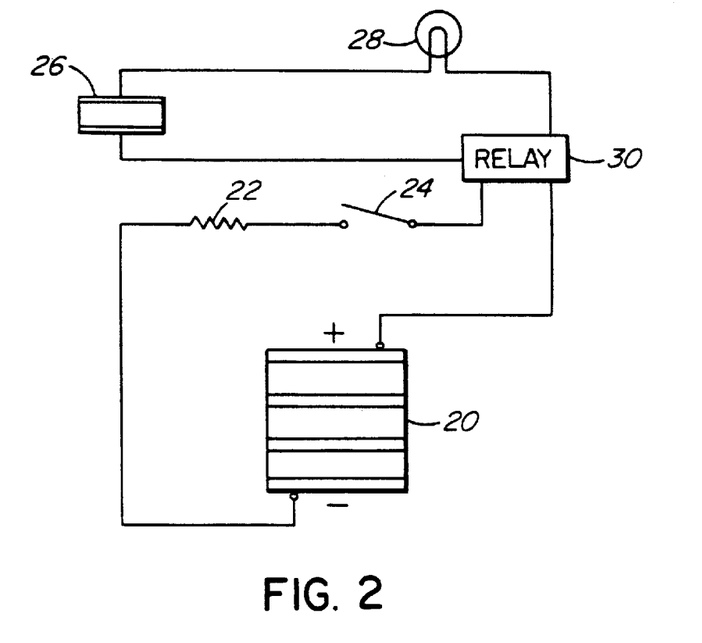
FIG. 2 illustrates the circuitry of a bipolar gas generator.
Figure 3:
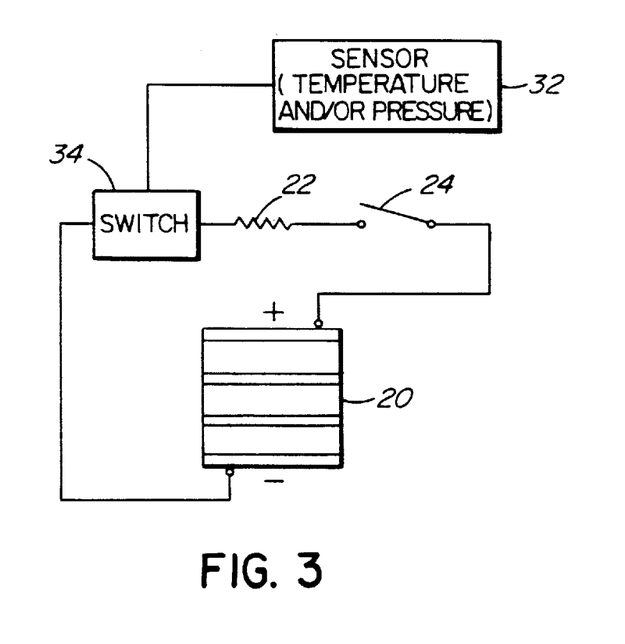
FIG. 3 illustrates a bipolar gas generator with feedback pressure and/or temperature control.

FIG. 2 illustrates an optional control circuit to that illustrated in FIG. 1. The circuit includes a secondary voltage source 26 to drive a blinking light 28 which indicates that the unit is operating. Relay 30 is included. FIG. 3 shows a further optional control circuit including a pressure and/or a temperature sensor 32 and a switch 34 that allows feedback control of the fluid dispensing rate.

As indicated above FIGS. 1 to 3 may be considered to be part of the prior art with the exception of the hydrogen generators. The resistor 22 in the external circuit controls the current and hence the rate of electrochemical gas generation according to Faraday's law of electrochemical equivalence.

Figure 4:
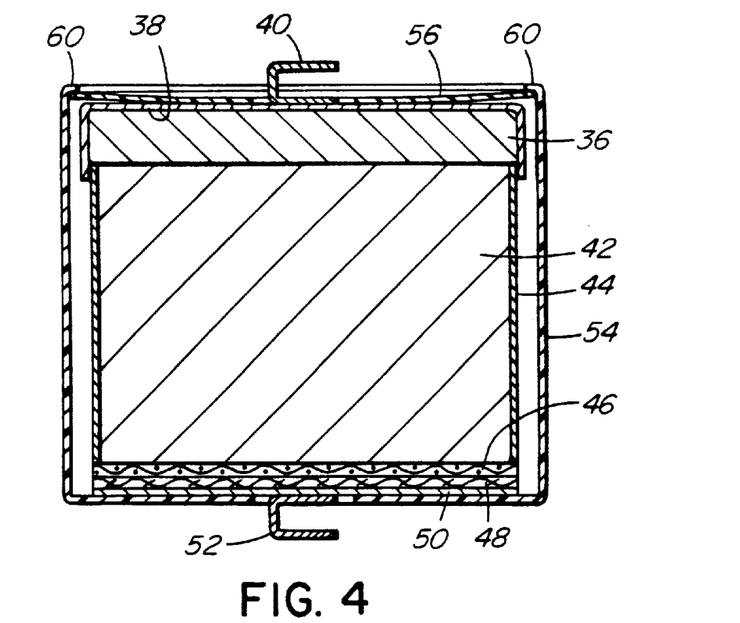
FIG. 4 is a section through a cell according to the present invention.
Figure 4A:
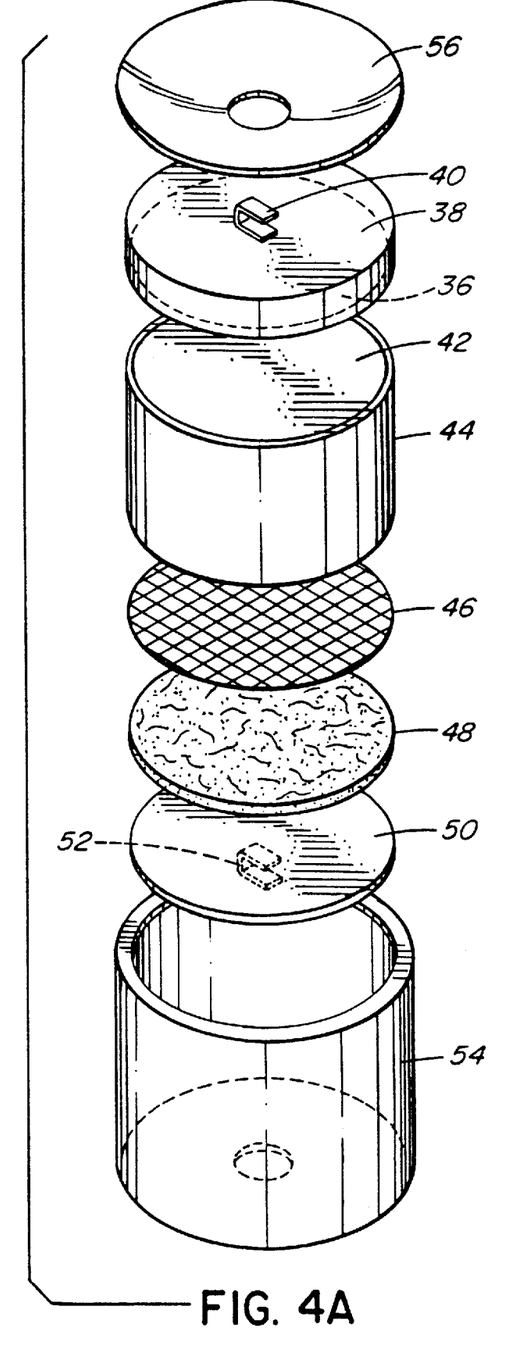
FIG. 4A is an exploded view of the cell of FIG. 4.

FIGS. 4 and 4A illustrate a cell according to the present invention. The cell is of a sandwich construction comprising a gelled zinc powder anode 36 in a brass cup 38 having a contact 40 to enable wiring to an external circuit. There is a gelled electrolyte 42 contained in a thin-walled tube 44 and a screen cathode 46 backed by a graphite felt 48 and a brass disk current collector 50, with a contact 52 to enable wiring to the external circuit. The cell is contained in a polypropylene cylinder 54. There is a plastic spring washer 56 on cup 38 retained by a lip 60 on cylinder 54.

Figure 5:
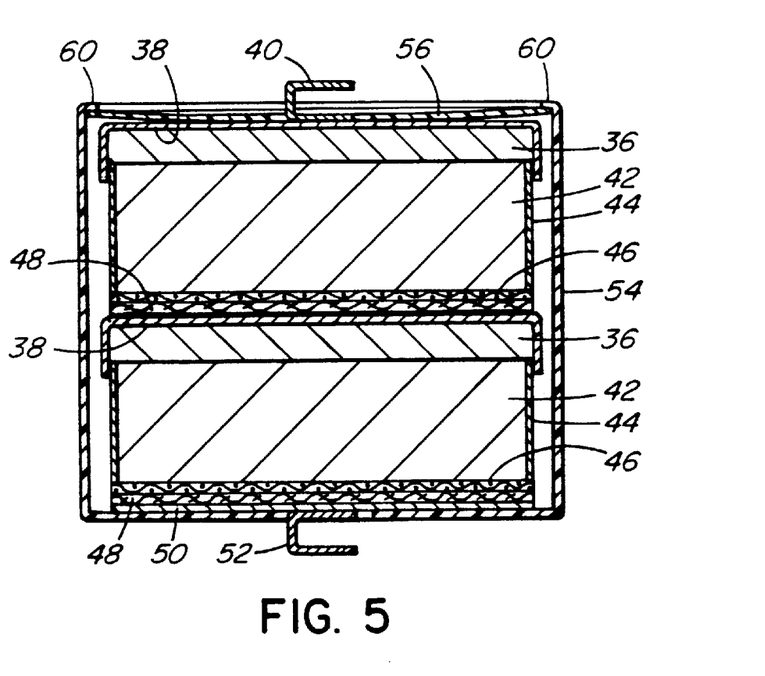
FIG. 5 is a section through a bi-cell bipolar hydrogen generator according to the invention.
Figure 6:
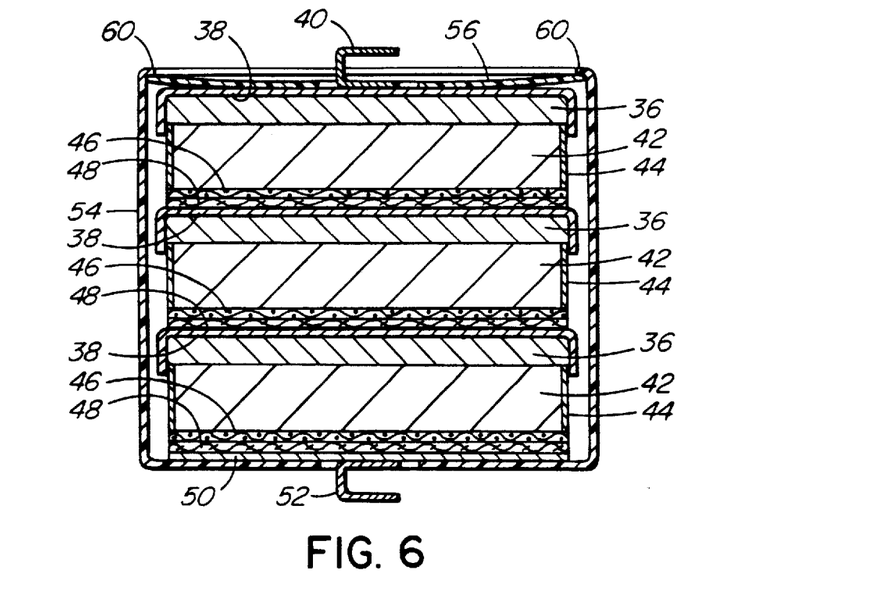
FIG. 6 is a section through a tri-cell bipolar hydrogen generator according to the present invention.

FIGS. 5 and 6 show the configuration of a bi-cell and a tri-cell reactor respectively. In these multiple cell reactor several of the cells shown in FIG. 4 are compressed in series with intimate electronic contact between adjacent anodes and cathodes. This is preferably achieved by the spring loading of washer 56. A polypropylene cylinder encompasses the composite cell. Reference numerals are as in FIGS. 4 and 4a.

Of course brass plate current collectors 50 with contacts 52 are omitted from all cathodes except the end cathode.

The invention is illustrated in the following examples:

EXAMPLE 1

A mono-cell hydrogen generator was constructed as in FIG. 4, with outside dimensions 19 mm diameter by 16 mm long. The anode consisted of 3 gram of zinc powder gelled with a mixture of 8M potassium hydroxide solution in water with a gelling agent and contained in a brass cup. The electrolyte consisted of 2 gram of 8M solution of potassium hydroxide which was absorbed into a hydrophillic cellulose sponge. The cathode was a platinum loaded gas diffusion electrode supported on a nickel screen and backed by a brass disk for a current collector.

The mono-cell was placed in a sealed bottle with an outlet connected by rubber tubing to a gas burette. The bottle was purged with nitrogen and the terminal wires from the cell were joined through a circuit with a 1 kOhm resistor. The cell voltage, current and gas generated were measured at intervals over a period of 120 days, operating at room conditions. The voltage and current were nearly constant, respectively at about 0.37 V and 0.35 mA over this period and the measured gas production was 250 ml at STP.

The nitrogen purge is needed to remove oxygen from the system. When oxygen is present the cathode reaction produces hydroxide instead of hydrogen ie.

$2H_2O+2e \rightarrow 2OH+H_2$ Desired reaction $O_2+2H_2O+4e \rightarrow 4OH$ Reaction with oxygen When oxygen is present in a closed system it must be consumed before hydrogen generation begins. At room conditions the open circuit voltage of a mono-cell when oxygen is present is about 1.4 volt but only about 0.4 volt without oxygen. The voltage thus gives a good indication of the presence of oxygen in the system.

Figure 7:
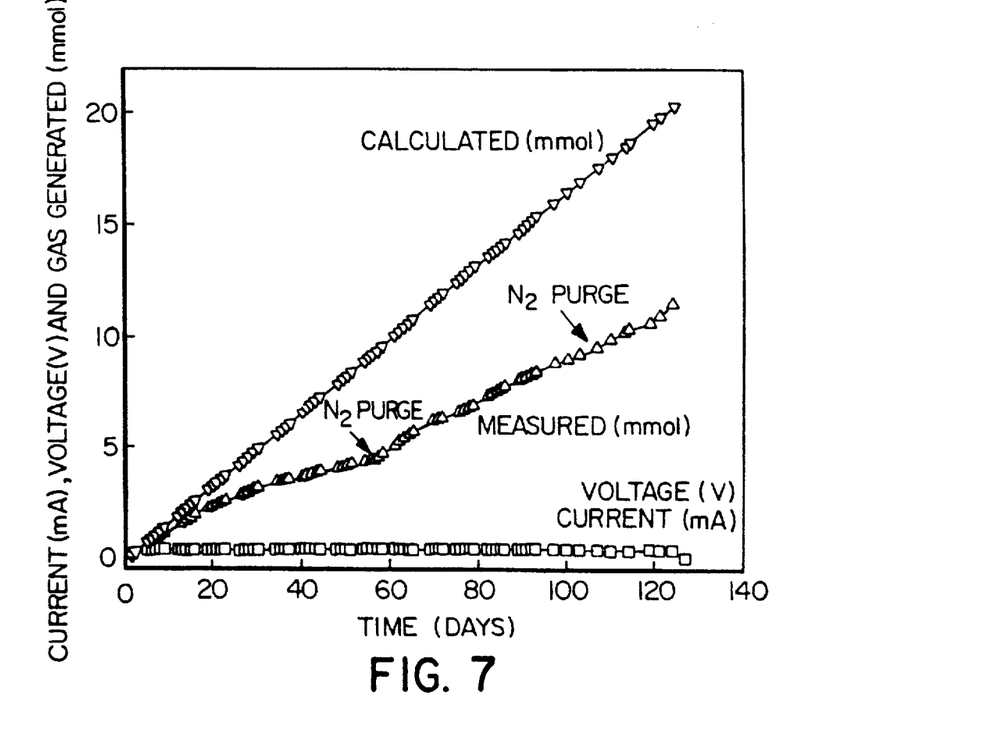
FIGS. 7 through 11 are graphs that illustrate the performance of bi-cell and tri-cell hydrogen generators.

FIG. 7 shows the performance curves for this unit, the line marked "calculated" is the gas production equivalent to the current, by Faraday's law, at 100% current efficiency. The net current efficiency of 55% for $H_2$ generation over 120 days is mostly the result of $H_2$ loss by diffusion through the rubber tubing, which is shown by the apparent increase in gas generation after the bottles is re-purged with nitrogen.

EXAMPLE 2

Figure 8:
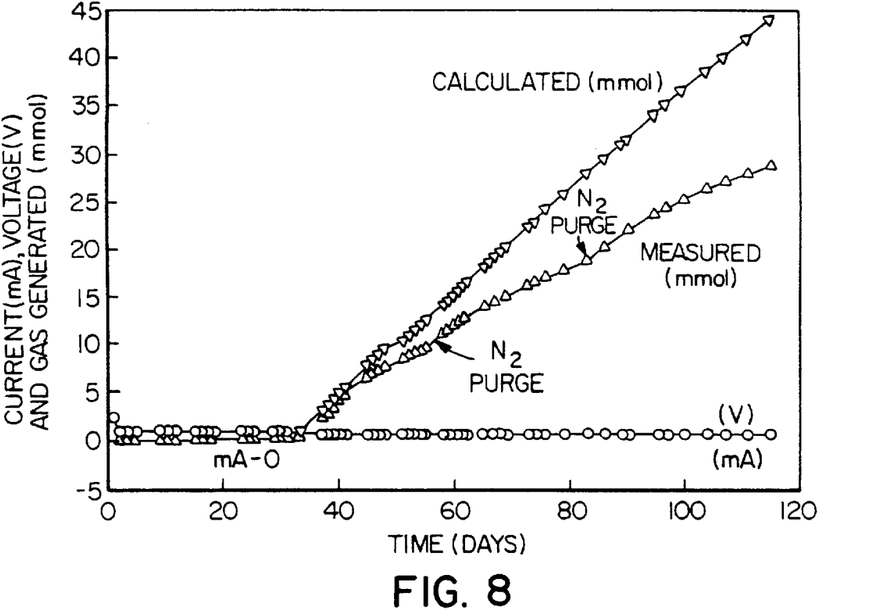

A bi-cell bipolar hydrogen generator was constructed as in FIG. 5, with outside dimensions 16 mm diameter by 60 mm long. Both anodes consisted of a brass cup containing 2.5 gram of zinc powder with 9M potassium hydroxide solution containing indium hydroxide and a gelling agent. Both electrolytes were 9M potassium hydroxide solution with indium hydroxide and a gelling agent. Both cathodes were platinised gas diffusion cathodes and a brass disk was used as a current collector at room conditions in a nitrogen purged bottle as described in Example 1. For the first 35 days the unit was kept on open circuit (0.85 Volt, zero current) and no gas was generated in this time. Subsequently the unit was connected through a 1 kOhm resistor and operated steadily at about 0.65 Volt, 0.62 mA to produce 620 ml (STP) hydrogen in 80 days at an apparent net current efficiency of 57%. Again, repeated nitrogen purges indicated losses of hydrogen by diffusion through the rubber tube. FIG. 8 shows the performance curve of this gas generator.

EXAMPLE 3

A bi-cell bipolar hydrogen generator was constructed as in FIG. 5, with outside dimensions 19 mm diameter by 24 mm long. Both anodes consisted of a brass cup containing 1.5 gram of zinc powder with potassium hydroxide solution and indium hydroxide and a gelling agent. Both electrolytes consisted of about 2.7 grams of a mixture of potassium hydroxide solution with indium hydroxide and a gelling agent. Both cathodes were platinised gas diffusion cathodes and a brass disk was used as a current collector at the terminal cathode.

Figure 9:
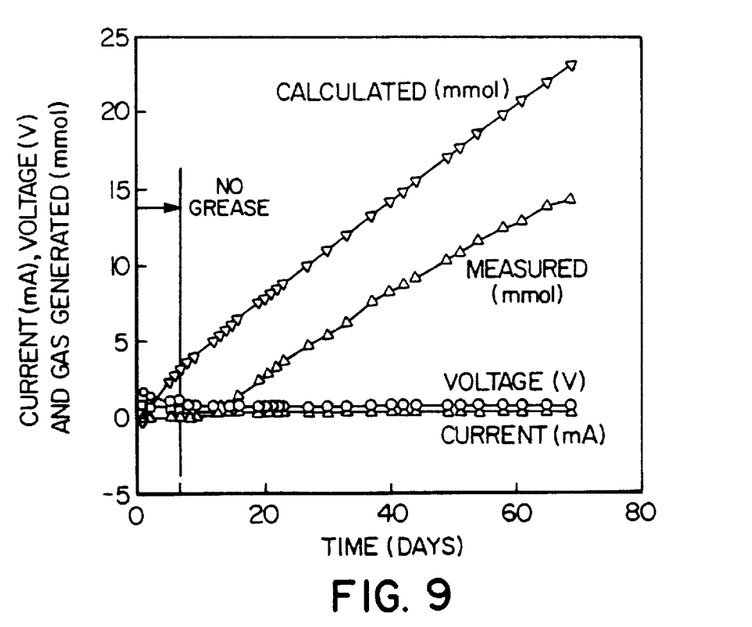

This unit was mounted and sealed inside the bellows of a lubricant dispenser (ATS ElectroLube's Jumbo-Luber—trade-mark) at room temperature and connected in series with a 2 kOhm resistor. The unit operated steadily at about 0.75 Volt, 0.36 mA for over 70 days. For the first 7 days operation the lubricant dispenser held no grease and no gas production was measured because hydrogen was lost by diffusion through the bellow. The unit was filled with grease on the 8th day and after a delay of about 5 days grease was driven from the unit at about 5.8 ml/day, corresponding to an apparent current efficiency for hydrogen generation of nearly 100% when an overpressure of 30 kPa is assumed inside the bellows. FIG. 9 shows the performance curve of this gas generator.

EXAMPLE 4

A tri-cell bipolar hydrogen generator was constructed as in FIG. 6, with outside dimensions 19 mm diameter by 24 mm long. All anodes consisted of a brass cup containing about 1.2 gram of zinc powder with potassium hydroxide solution containing indium hydroxide and a gelling agent. The central electrolyte gel was contained in a thin walled plastic tube. All cathodes were platinised gas diffusion cathodes and a brass disk was used as a current collector at the terminal cathode. This unit was mounted and sealed inside the bellows of a lubricant dispenser (ATS ElectroLube's Jumbo-Luber—trade-mark) at room temperature. On open circuit (zero current) the unit showed an initial 3.1 Volt which dropped over 9 days to 1.4 Volt and then remained stable at 1.4 Volt for 55 days, during which time no gas was produced. The unit was then connected in series with a 1 kOhm resistor to give a current of about 1 mA and lubricant was driven from the dispenser for a period of 10 days at a rate of about 24 ml per day, corresponding to a current efficiency of nearly 100% for hydrogen generation by the tri-cell.

Figure 10:
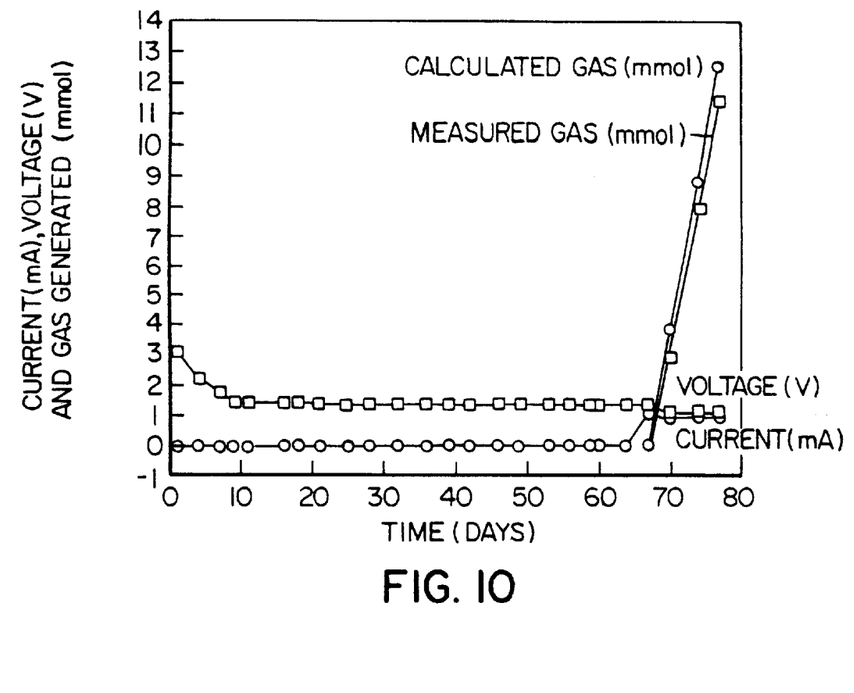

FIG. 10 shows the performance curve of this tri-cell unit.

EXAMPLE 5

A bi-cell bipolar hydrogen generator was assembled as in Example 3, except that the cathodes were platinised nickel screen made by briefly immersing a nickel screen in a water solution of chloroplatinic acid then heating the screen at 450° C. for 30 minutes. Each cathode was backed by a 0.3 mm thick disk of compressed graphite felt. This unit was mounted and sealed inside the bellows of a lubricant dispenser (ATS ElectroLube's Jumbo-Luber—trade-mark) at room temperature, connected for 2 days to a 1 kOhm resistor, left on open circuit for 14 days, connected again to a 1 kOhm resistor for 2 days then left at open circuit for 10 days. The initial voltage fell from about 2 V at open circuit to about 0.6 V with a 1 kOhm load, rose again to 1.3 V on open circuit then dropped to 0.7 V with a 2 kOhm load and rose to about 0.8 V on open circuit over the last 10 days. With a 2 kOhm load the unit drew a current of about 0.3 mA and produced about 22 ml (STP) of gas in 4 days— corresponding to a current efficiency of nearly 100% for hydrogen generation. The unit was then operated at open circuit for 40 days, during which time about 7 ml of gas was produced, then again with a 2 kOhm load that produced about 40 ml (STP) of gas in 7 days, at about 100% current efficiency for hydrogen.

Figure 11:
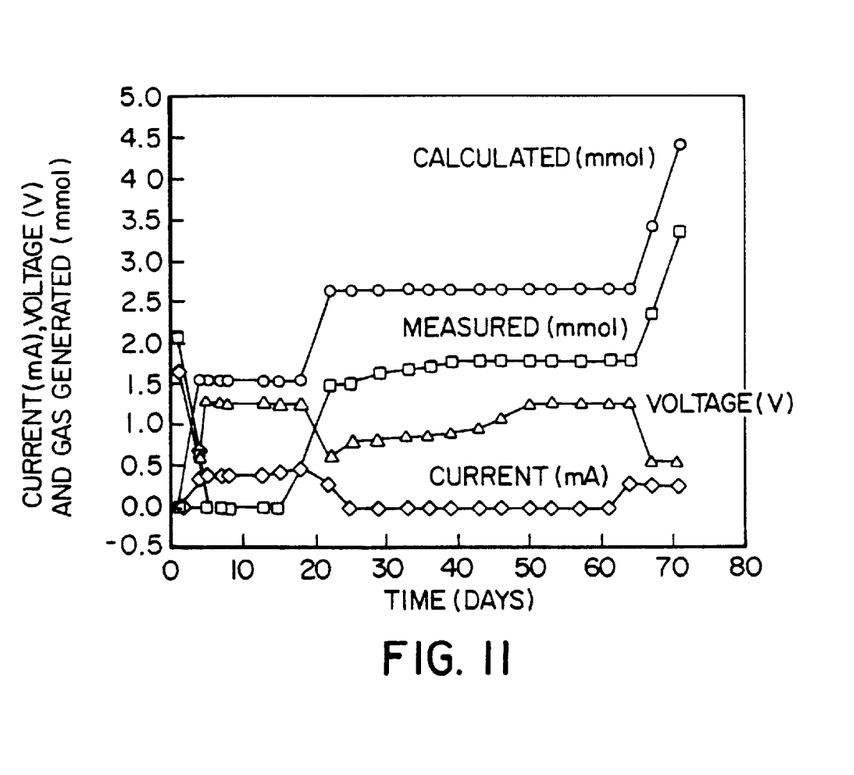

FIG. 11 shows the performance curve for this unit.

The above Examples demonstrate the effectiveness of the present invention and its superiority over the listed prior art for dispensing fluids by auto-electrolytic hydrogen generation. The invention allows simple construction of gas generating cells with a large reservoir of electrolyte relative to anode volume. The cells can produce a volume of hydrogen, measured at STP, about 100 times the volume of the cell. The bipolar stack is a compact inexpensive system with higher operating voltage and lower current and a single cell for the same gas generation rate. These stacks can take advantage of the temperature compensating characteristics of a higher external electronic resistance and allow the use of external control circuits, which require relatively high voltage (for example greater than 1 volt, for example to drive a light emitting diode as an indicating light) without needing a secondary voltage source.

The simple mono-cell construction avoids the need for a metal case with seals, ion-exchange membranes (separators) and hydrophobic membranes to prevent electrolyte leakage as specified, for example, in the above Canadian Patent 1,333,579. These components are the characteristic components of a commercial zinc/air battery upon which the above Canadian patent is based. The composition of the electrolyte of the present invention also provides a large reservoir of water for hydrogen generation and eliminates the need to amalgamate the zinc anode with mercury to suppress hydrogen generation due to self-corrosion of the zinc. Suppression of the spontaneous generation of hydrogen at open circuit is critical to prevent discharge from the fluid dispenser when it is not in use.

The multi-cell bipolar hydrogen generator of the present invention provides a compact device with high operating voltage and low current. This allows better control and less sensitivity to temperature and pressure variation compared with the mono-cells of the prior art. The elimination of hydrogen generation due to self discharge on open circuit is a major improvement over prior multi-cell devices. This ability is vital for the desired fluid dispensing application.

Although the present invention has been described in some detail by way of illustration and example for purposes of clarity and understanding, it will be readily apparent to those of ordinary skill in the art in light of the teachings of this invention that certain changes and modifications may be made thereto without departing from the spirit or scope of the appended claims.

We claim:

1. A bipolar wall assembly in an electrolytic hydrogen generating reactor, the wall assembly comprising:
   a. a first electrolyte;
   b. a non-porous, first electrolyte container holding the first electrolyte and having an open end;
   c. a first electrolyte cathode in the open end of the first electrolyte container, the first electrolyte cathode being in contact with the first electrolyte;
   d. an electronically conductive porous barrier in contact, with the first selectrolyte cathode, the first electrolyte cathode and the barrier together being positioned against the open end of the first electrolyte container to hold the first electrolyte in the first electrolyte container and adapted to allow hydrogen gas to escape from the first electrolyte container when hydrogen gas is produced at the first electrolyte cathode;
   e. a non-porous conductive cap housing an anode, the cap electrochemically separating the anode from the barrier, the cap being in contact with the barrier, the barrier separating the first electrolyte cathode from the cap;
   f. a second electrolyte in contact with the anode;
   g. a non-porous second electrolyte container holding the second electrolyte, the cap engaging the second electrolyte container to hold the second electrolyte;
   wherein the bipolar wall assembly prevents ionic contact between the first and second electrolytes while permitting electrical coupling between the first and second electrolytes.

2. The bipolar wall assembly of claim 1 wherein the anode comprises a metal having a standard oxidation potential above that of hydrogen.

3. The bipolar wall assembly of claim 1 wherein the cathode comprises an inert electronic conductor with a surface in contact with the first electrolyte, the surface being electrochemically catalytic for the formation of hydrogen.

4. The bipolar wall assembly of claim 1 wherein the anode comprises a metal selected from the group consisting of zinc and aluminum.

5. The bipolar wall assembly of claim 1 wherein the anode comprises a zinc powder dispersed in a water base gel.

6. The bipolar wall assembly of claim 1 wherein the first electrolyte is fixed as a paste or a gel.

7. The bipolar wall assembly of claim 1 wherein the first electrolyte is fixed in a sponge.

8. The bipolar wall assembly of claim 1 wherein the anode is zinc and the first electrolyte is a gelled aqueous solution of potassium hydroxide.

9. The bipolar wall assembly of claim 1 wherein the cathode comprises a stable electronic conductor selected from the group consisting of platinum, palladium, nickel, platinized carbon/polytetrafluoroethylene and nickel meshes having a platinum surface.

10. The bipolar wall assembly of claim 1 wherein the cap is brass.

11. The bipolar wall assembly of claim 1 wherein the anode is zinc, the first electrolyte is gelled potassium hydroxide and the cap is brass.

12. The bipolar wall assembly of claim 1 wherein the porous barrier comprises a graphite felt.

13. The bipolar wall assembly of claim 1 wherein the first and second electrolyte containers are non-conductive.

14. The bipolar wall assembly of claim 1 wherein the cap is cup-shaped, having circumferential walls enclosing the anode, the circumferential walls engaging the second electrolyte container.

15. An electrolytic hydrogen generating reactor comprising a plurality of cells stacked in series in a housing, the cells being separated by the bipolar wall assembly of claim 1.

16. The electrolytic hydrogen generating reactor of claim 15 wherein the cells are biased together by a biasing member in the housing.

17. The electrolytic hydrogen generating reactor of claim 15 comprising external positive and negative poles electrochemically coupled through the series of cells and electronically coupled through and external circuit.

18. The electrolytic hydrogen generating reactor of claim 17 wherein the external circuit comprises a switch and an adjustable resistance.

19. The electrolytic hydrogen generating reactor of claim 18 wherein the adjustable resistance has a positive temperature coefficient of resistivity.

20. The electrolytic hydrogen generating reactor of claim 15 wherein the reactor is in fluid communication with a fluid dispenser adapted so that hydrogen gas produced by the reactor forces fluid from the fluid dispenser.

* * * * *